UNITED STATES PATENT OFFICE.

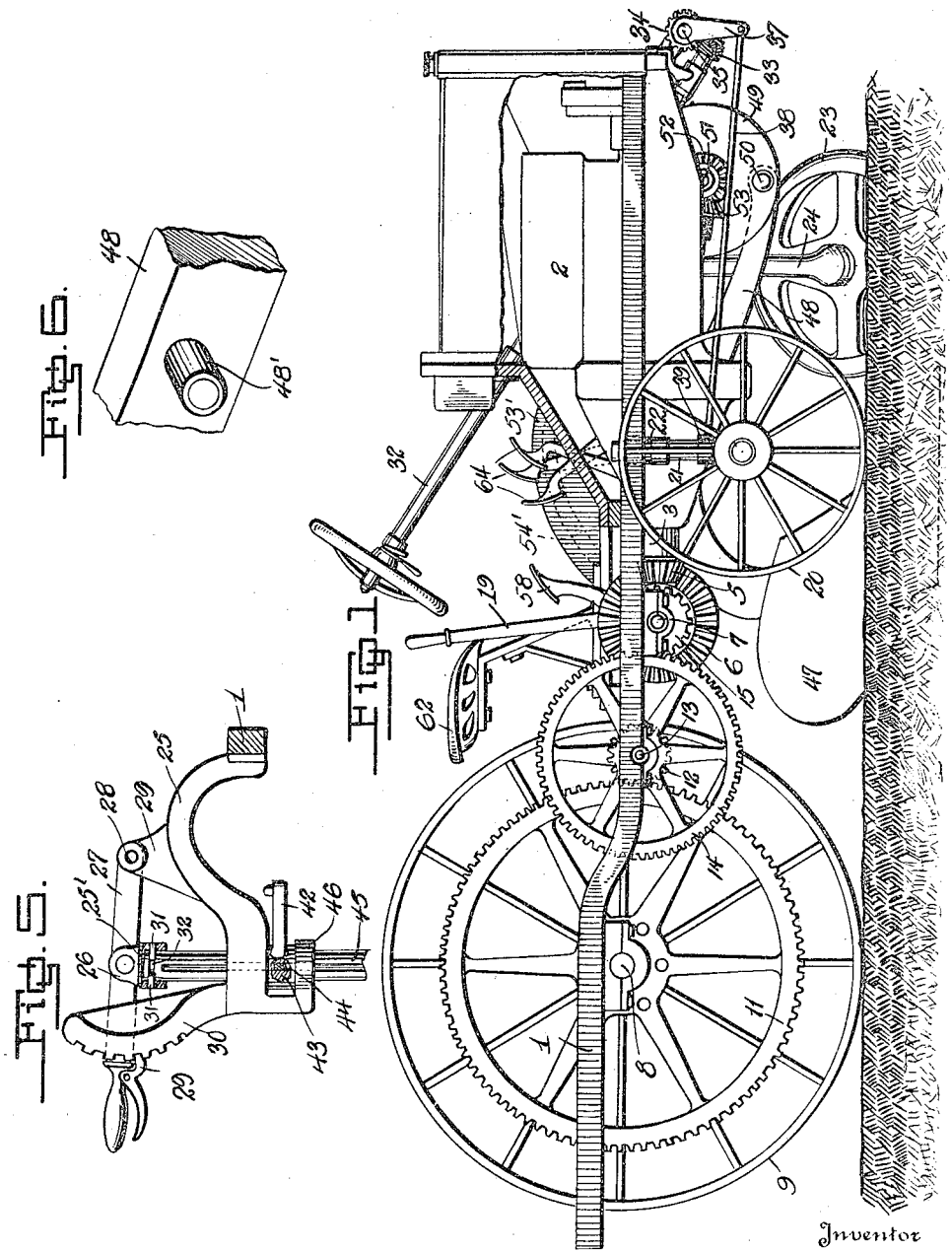

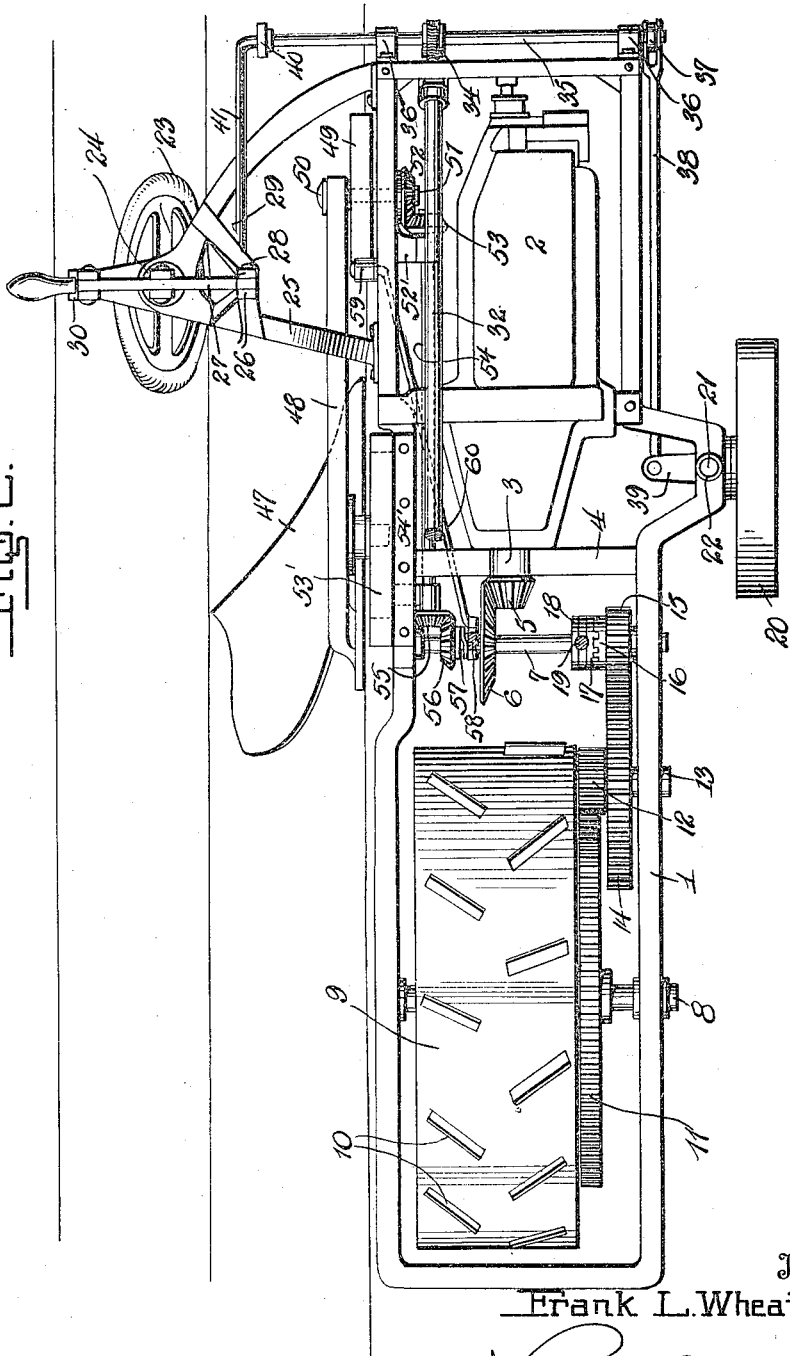

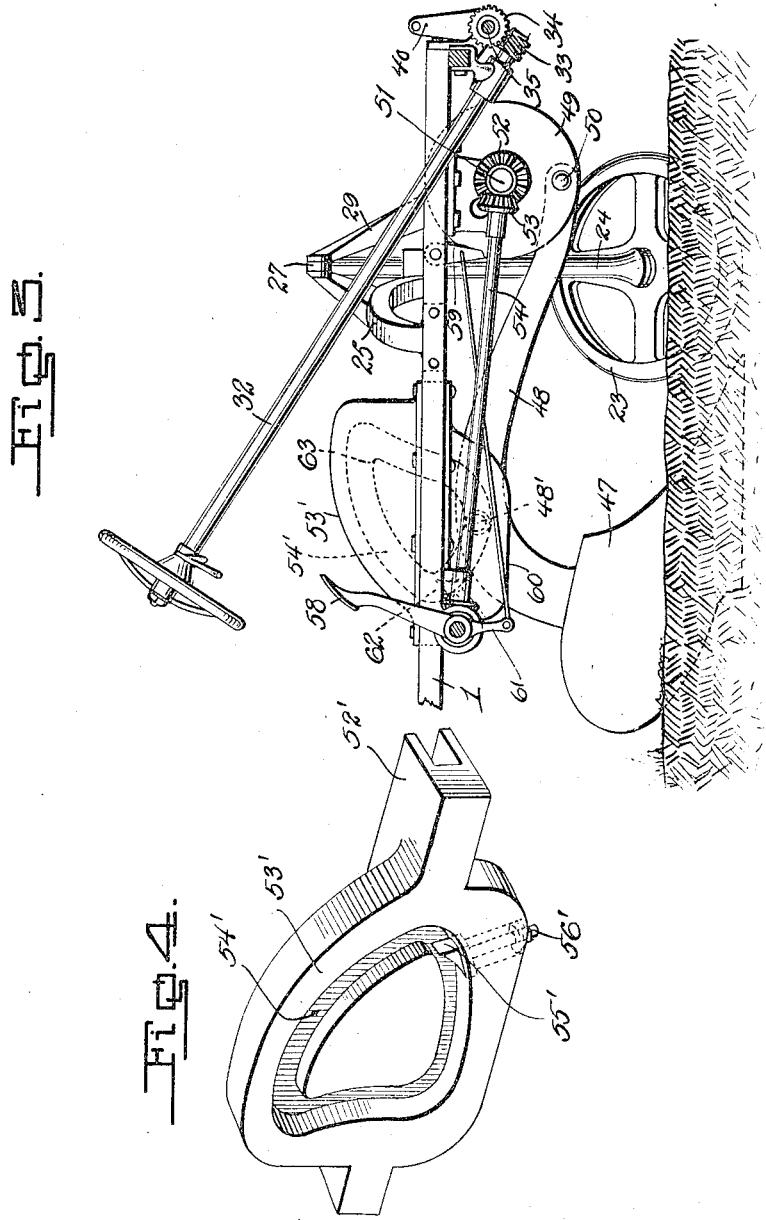

FRANCIS LARUE WHEATLEY, OF NOBLESVILLE, INDIANA.

TURNING-PLOW-LIFTING MECHANISM.

1,289,333.  Specification of Letters Patent.  Patented Dec. 31, 1918.

Application filed November 28, 1917. Serial No. 204,408.

*To all whom it may concern:*

Be it known that I, FRANK L. WHEATLEY, a citizen of the United States, and a resident of Noblesville, in the county of Hamilton and State of Indiana, have invented certain new and useful Improvements in Turning-Plow-Lifting Mechanism, of which the following is a specification.

This invention relates to gasolene tractor plows, and more particularly to a mechanism for automatically lifting the plow bottom out of a working position during the travel of the plow.

An object of this invention is to provide, in a tractor plow structure of the breaking or turning type, means operated by the operation of the prime mover of the plow to automatically lift the plow bottom from a working position which means includes a rotatable disk to which the forward end of the plow bottom carrying beam is eccentrically connected, a channeled cam for association with the plow beam to lift the same at the plow bottom during the rotation of the disk, means for locking the disk against rotation, means for controlling the rotation of the disk and means for synchronously operating the controlling means and the locking means to permit rotation of the disk when desired and to arrest or stop the rotation of the disk, by its locking means, when the said locking means reaches an operative position, preventing rotation of the disk, after the rotating means has been disconnected therefrom, and the plow bottom has reached its proper position, which rotation might be caused by the action of gravity upon the disk and plow beam, causing them to seat their dead centers.

Other objects of the invention will be readily apparent from a consideration of the following detailed description and of the accompanying drawing, wherein:

Figure 1 is a side elevation of the tractor showing the plow in operative position.

Fig. 2 is a plan view.

Fig. 3 is a fragmentary section taken on the line 3—3 of Fig. 2.

Fig. 4 is a perspective view of a detail of the invention.

Fig. 5 is a detail side elevation of the adjusting mechanism for the colter wheel.

Fig. 6 is a perspective view of a detail of the invention.

Referring to the drawings, wherein is illustrated the preferred form of my invention and in which like characters of reference indicate corresponding parts throughout the several views, the main frame 1 has mounted at its forward end a gasolene motor 2 the crank shaft of which extends slightly beyond the end of the motor in the usual manner. This extended end of the shaft is journaled in a bearing 3 mounted upon a cross arm 4 of the same and the terminal of the shaft carries a beveled pinion 5 in mesh with a beveled gear 6 mounted on a counter shaft 7. The counter shaft 7 extends transversely and has its ends journaled in suitable bearings carried by the side bars of the frame at a point approximately intermediate the ends thereof. Since this shaft is directly connected to the motor shaft it will be obvious that while the motor is running, the shaft 7 will be turning and, consequently the different parts of the device which are power-driven will receive their motion from a connection with this shaft 7.

A rear axle 8 is journaled in bearings carried by the side bars of the frame and mounted upon the axle is the tractor wheel 9 of relatively large diameter and having its ends provided with cleats 10 of any preferred construction. Welded to the tractor wheel is a large ring gear 11, the teeth of which are in mesh with a pinion 12 mounted upon a stub-shaft 13 carried by the frame at a point between the counter shaft 7 and the axle 8. The stub-shaft 13 also carries a large gear 14 in mesh with a driving gear 15 loosely mounted upon the counter shaft 7. Integrally formed with this driving gear 15 is one element 16 of a clutch 17 the complementary element of which is fixed to the shaft 7 as indicated at 18 whereby engagement of the two clutch elements will impart rotary movement to the gear 15 which will be correspondingly imparted to the tractor wheel through the train of gears 11, 12, 14 and 15. For conveniently moving the clutch element 18, I have provided a hand lever 19 extending upwardly to a point within convenient reach of the operator of the tractor as shown to advantage in Fig. 1 of the drawing.

A land wheel 20 is mounted upon a pintle 21 carried by the frame and this pintle is adapted for turning movement in a sleeve 22 whereby the wheel 20 may be turned when the tractor is guided. At the opposite side of the frame is a colter wheel 23 adapted for operation in a furrow made by the plow as will presently appear. This colter wheel is mounted upon a vertical standard 24 carried by an extended portion 25 of the frame and, as shown in detail in Fig. 5 of the drawing, the upper end of this standard is provided with a cap 25' having laterally spaced ears 26 between which a lever 27 is pivotally mounted. A pivotal connection of the lever 27 with the extended portion 25 of the frame is established through a pivot pin 28 carried by the arms 29 which are extended upwardly from the portion 25 of the frame. The opposite end of the lever 27 is provided with a handle having a pawl 29 pivotally connected thereto and engageable with the teeth of a segment 30 thereby permitting adjustment of the lever 27 for raising and lowering the colter wheel 23.

It is necessary that the standard 24 be mounted in a manner that will permit it to readily turn so that the wheel 23 may turn when the tractor is to be guided and, therefore, I have provided pins 31 in the cap 25 and the terminals of the pins project into an annular groove 32 in the upper end of the standard 24. In this manner the standard may be raised and lowered independently of its rotary movement.

For simultaneously turning both of the wheels 20 and 23, I have provided a steering post 32 having the usual steering wheel mounted on one end and a worm 33 mounted at its opposite end and in mesh with a worm wheel 34 carried by a steering shaft 35 the latter being mounted in bearing sleeves carried by brackets 36 fixed to the front end of the frame.

Attached to one end of the shaft 35 is a turning arm 37 having a connecting rod 38 attached thereto, the opposite end of which is jointed to a turning lever 39 fixed to the pintle 21. At the opposite end of the shaft 35 is an upwardly projecting turning arm 40 which receives one end of a connecting rod 41 the opposite end of which is joined to a second turning lever 42 fixed to a collar 43, the latter being slidably mounted on the standard 24 whereby longitudinal adjustment of the standard will be permitted. Turning movement of the standard through the medium of the turning lever 42, however, is accomplished through the medium of a stud 44 carried by the collar and extending into a longitudinal groove 45 in the standard 24, as shown to advantage in Fig. 5 of the drawing. Displacement of the collar 43 from the desired position on the standard 24 is prevented by a retaining flange 46 carried by the projected portion of the frame, thus providing a structure that will embrace the collar 43 and maintain it in engagement with the frame structure regardless of the adjusted position of the standard 24.

Since the turning arm 37 depends from the end of the shaft 35 and the turning lever 40 extends upwardly from the opposite end of the shaft 45, it will be obvious that turning movement of the shaft 35 will turn the turning levers 39 and 42 in opposite direction but since the levers project toward each other, the wheels 20 and 23 will be simultaneously turned in the proper direction to properly guide the tractor during forward and rearward movement.

A single plow 47 is employed in connection with the tractor for plowing purposes and the plow beam 48 is of substantially the usual construction and formation. The end of the plow beam 48, however, instead of being rigidly fixed to a part of the tractor frame is joined to a disk 49 at a point near the periphery thereof through the medium of a connecting pin 50. This disk is mounted upon a stub-shaft 51 carried by a bracket 52 preferably fixed to the left hand side of the frame, at a point near the forward end thereof whereby the plow beam 48 may be attached to the disk for permitting the plow to operate on the area between the tractor wheel and the colter wheel as shown to advantage in Fig. 2 of the drawing. This permits the colter wheel 23 to run in the furrow previously made by the plow while the land wheel 20 and the tractor wheel 9 may support the frame on the unplowed surface. The disk 49 is provided to coöperate with a lifting mechanism for the plow which includes an elevator or lifting cam 53' shown in detail in Fig. 4 of the drawing, and which is adapted to be rigidly fixed to the frame 1. As shown, this lifting cam includes the flanges 52' adapted to embrace and be securely fixed to one of the side bars of the frame, the flanges being integrally formed with a comparatively heavy casting in the form of an irregular plate having one of its surfaces provided with a groove or channel 54'. This channel 54', while shown in full lines in Fig. 4 of the drawing, is clearly illustrated in Fig. 3 in dotted lines which illustrates the manner of its coöperation with a roller 48' carried by the plow beam and the coöperation of the disk 49 with the lifting cam to raise the plow beam for lifting the plow 47 out of the furrow. As shown in Fig. 6, the roller 48' projects laterally from one side of the plow beam and is adapted to extend into the groove 54' and normally rest in the lowermost portion of the groove when the plow is in operation. When thus disposed, the pin 50 which connects the plow beam 48 to the disk 49 is in vertical alinement with the center of the disk. Slidably mounted in the casting or plate at a point near the rearmost turn in the groove 54' is a sliding latch 55' attached to a pin 56' which is embraced by the coils of a tension spring acting upon the latch member 55' to normally hold the same in extended position in the groove for a purpose that will presently appear.

The end of the stub-shaft 51 upon which the disk 49 is mounted is provided with a beveled gear 52 in mesh with a beveled pinion 53 carried by a longitudinally disposed shaft 54, the ends of which are journaled in suitable brackets fixed to the frame. The rearmost end of the shaft 54 terminates at a point near the counter shaft 7 and carries a beveled gear 55 in mesh with a beveled gear 56 loosely mounted on the shaft 7. Through this shaft 54 and the intermeshing gears 51, 52, 55 and 56, the disk 49 may be turned when a positive connection of the gear 56 with the shaft 7 is made. Since this gear 56 is normally loose upon the shaft, I have provided a clutch 57 operated by a foot pedal 58 which, when pressed forwardly, will actuate the clutch member to positively connect the gear 56 with the shaft 7. This engagement of the clutch by the lever 58, however, is accomplished only after the foot pedal or lever is moved forwardly for a short distance and this slight forward movement of the lever, before throwing the clutch, is utilized for releasing the disk 49 from engagement with a locking pawl 59 pivotally mounted on the frame and having a connection with a release rod 60 the terminal of which is joined to a depending portion 61 of the foot pedal or lever 58. Thus, when the lever 58 is operated to throw the clutch 57, the preliminary movement of the lever will release the locking pawl 59 and permit the disk 49 to turn after the clutch has been placed in operative position. Releasing of the clutch is accomplished through a release of the foot pressure on the foot pedal 58 which, it will be observed, is within convenient reach of the foot of the operator who will be seated on the seat 62 mounted upon the frame.

Assuming now that the function of the plow 47 is to be temporarily dispensed with and it is desirable that the plow 47 be raised in a position where it will be free from engagement with the ground. The foot lever 58 will be pressed slightly forwardly and the locking pawl thereby released from engagement with the notch formed in the marginal edge of the disk. Forward movement of the tractor, the plow being still in the ground, will cause the plow beam to exert a pull on the pin 50 which, of course, will turn the disk 49 and the roller 55 will travel through the rearwardly extending portion of the groove 54 while, at the same time, the plow will be slightly raised by virtue of this inclined portion of the groove. When the roller 55 reaches the corner indicated at 62, it will have passed over the latch 55 and the latter will immediately spring to operative position and maintain the roller in the corner 62 whereupon the operator will press further upon the foot lever 58 and throw the clutch 57 into operation for causing turning movement to be imparted to the stub-shaft 51 through the medium of the shaft and gear connection. The shaft 51, being fixed to the disk 49 will turn the disk 49 and, of course, the roller 54 will travel upwardly through the upwardly extending forwardly inclined portion of the groove 54. When the disk 49 has made three-quarters of a complete turn, the operator will release the clutch and the roller 55 will then be stopped at the point 63 in the groove, the plow being elevated sufficiently to cause it to be free of the ground. The plow may be held in this position as long as desired and after the colter wheel has been elevated as previously described, the machine may be employed as a tractor for drawing harrows, cultivators, gang plows or any other desirable farming implements.

When the plow is to again be returned to operative position, it is simply necessary to throw the clutch 57 again into operative position and slightly turn the disk 49 until the roller 55 passes over the point 63 whereupon the plow, of its weight, will drop into operative position, the roller following the course of the groove until the roller reaches the lowermost portion of the groove at which point the plow is ready for operation, since the locking pawl 59 will drop into the notch in the edge of the disk as soon as the disk has made a complete revolution.

The pedals indicated at 64 in Fig. 1 are the usual pedals employed in the operation of a well known type of motor which is preferably employed with this tractor.

It will be observed that the lever 27 which is employed for raising and lowering the colter wheel, is not disposed in a position where it may be reached by the operator from his seat, but since the operation of this lever is only necessary when the device is to be converted into an ordinary tractor, it will be apparent that the operator may make these adjustments before beginning the operation of the machine and further adjustment of the lever 27 will be unnecessary until the device is to be again converted for use as either a plow or a tractor. All of the other operating levers, however, are within convenient reach of the occupant of the seat 62 so that it is unnecessary for him to get out of the seat for any purpose during the operation of the device.

The simplicity of the construction and the ease with which the device may be manipulated and the apparent saving in labor, time and money will render the device especially adapted for use by farmers of average means. It will be also observed that the particular arrangement of the disk 49 and the lifting cam will permit the application of any size plow to the mechanism, it being simply necessary to attach one end of the plow to the pin 50 and mount the roller 55 in a position on the plow beam where it may engage the groove 54.

Any type of suitable connection may be mounted upon the frame at any desirable point for the purpose of connecting and attaching a corn-binder, disk harrow, mower, manure spreader, ensilage cutter, feed grinder or any other type of farming implement or machine adapted for operation with a power driven tractor of this type.

From the foregoing, it will be observed that a comparatively simple and relatively cheaply constructed tractor has been provided, the details of which embody the preferred form. I desire to be understood, that slight changes may be made in the details of construction without departing from the spirit of the invention or the scope of the claims hereunto appended:

I claim:

1. In a plow, the combination, of a disk, a plow beam having its forward end eccentrically connected to said disk, means for rotating said disk, means controlling the rotation of said disk by said rotating means, means for locking said disk against rotation, and means for synchronously operating the controlling means, and said locking means.

2. In a plow, the combination, of a disk, means for rotating said disk, means controlling the rotation of said disk by said rotating means, means for locking said disk against rotation, a plow beam having its forward end eccentrically connected to said disk, a lifting cam having an irregular channel formed in one face thereof, a roller carried by the plow beam for travel in said channel to impart a lifting movement to the plow beam upon rotation of the disk, and means for synchronously operating said controlling means and said locking means to permit rotation of said disk.

3. In a plow, the combination, of a disk, means for rotating said disk, means for controlling the rotation of said disk by said rotating means, means for locking said disk against rotation, a plow beam having its forward end eccentrically connected to said disk, a lifting cam having an irregular channel formed in one face thereof, a roller carried by the plow beam for travel in said channel to impart a lifting movement to the plow beam upon rotation of said disk, means for synchronously operating said controlling means and said locking means to permit rotation of the disk, a spring pressed obstruction carried by said cam and extending into the channel thereof to prevent reverse movement of the roller in the channel.

4. In a plow, the combination, of a disk, a plow beam having its forward end eccentrically connected to said disk, means for rotating the disk, a lifting cam having an irregular channel formed in one face thereof, a roller carried by the plow beam for travel in said channel to impart a lifting movement to the plow beam upon rotation of the disk, a spring pressed obstruction carried by said cam and extending into the channel thereof to prevent reverse movement of the roller in the channel.

5. In a plow, the combination, of a disk, provided with a peripheral shoulder, means for rotating said disk, a clutch mechanism controlling the rotation of said disk by said rotating means, a locking dog for engagement with said peripheral shoulder to lock said disk against rotation, and means for synchronously operating said clutch and said locking dog to permit or arrest rotation of said disk.

6. In a plow, the combination, of a disk provided with a peripheral shoulder, means for rotating said disk, a clutch mechanism for controlling the rotation of the disk by said rotating means, a locking dog for engagement against said shoulder to lock said disk against rotation, a plow beam having its forward end eccentrically connected to said disk, a lifting cam having an irregular channel formed in one face thereof, a roller carried by the plow beam for travel in said channel to impart a lifting movement to the plow beam upon rotation of the disk, and means connected to said clutch mechanism and said locking dog mechanism for synchronously operating them to permit or arrest rotation of said disk.

7. In a plow, the combination, of a disk provided with a peripheral shoulder, means for rotating said disk, a clutch mechanism for controlling the rotation of the disk by said rotating means, a locking dog for engagement against said shoulder to lock said disk against rotation, a plow beam having its forward end eccentrically connected to said disk, a lifting cam having an irregular channel formed in one face thereof, a roller carried by the plow beam for travel in said channel to impart a lifting movement to the plow beam upon rotation of the disk, means connected to said clutch mechanism, and said locking dog mechanism for synchronously operating them to permit or arrest rotation of said disk, a spring pressed obstruction carried by said cam and extending into the channel thereof to prevent reverse movement of the roller in the channel.

FRANCIS LARUE WHEATLEY.